United States Patent
Eirinberg et al.

(10) Patent No.: US 12,082,768 B2
(45) Date of Patent: Sep. 10, 2024

(54) POINT AND CLEAN

(71) Applicant: Snap Inc., Santa Monica, CA (US)

(72) Inventors: Dylan Shane Eirinberg, Venice, CA (US); Daniel Trinh, Paris (FR)

(73) Assignee: Snap Inc., Santa Monica, CA (US)

( * ) Notice: Subject to any disclaimer, the term of this patent is extended or adjusted under 35 U.S.C. 154(b) by 371 days.

(21) Appl. No.: 17/513,355

(22) Filed: Oct. 28, 2021

(65) Prior Publication Data
US 2023/0137440 A1    May 4, 2023

(51) Int. Cl.
*A47L 9/28* (2006.01)
*A47L 7/00* (2006.01)
(Continued)

(52) U.S. Cl.
CPC .......... *A47L 9/2894* (2013.01); *A47L 7/0004* (2013.01); *A47L 9/2826* (2013.01); *A47L 9/2847* (2013.01); *A47L 9/2852* (2013.01); *G05D 1/0016* (2013.01); *G05D 1/0221* (2013.01); *G05D 1/0287* (2013.01); *G06V 20/176* (2022.01); *H04L 51/10* (2013.01); *H04L 51/222* (2022.05);
(Continued)

(58) Field of Classification Search
CPC .... A47L 9/2894; A47L 7/0004; A47L 9/2826; A47L 9/2847; A47L 9/2852; A47L 2201/04; A47L 2201/06; G05D 1/0016; G05D 1/0221; G05D 1/0287; G05D 2201/0215; G06V 20/176; H04L 51/10; H04L 51/222; H04L 67/306; G06Q 10/0631; G06Q 10/101; G06N 3/084; G09B 29/007
See application file for complete search history.

(56) References Cited

U.S. PATENT DOCUMENTS 8,120,459 B2    2/2012  Kwak
8,374,721 B2 *  2/2013  Halloran ............... A47L 9/2894
                                               342/450
(Continued)

FOREIGN PATENT DOCUMENTS

WO    2023076508    5/2023
WO    2023076909    5/2023

OTHER PUBLICATIONS

"U.S. Appl. No. 17/532,430, Final Office Action mailed May 24, 2023", 16 pgs.
(Continued)

*Primary Examiner* — Calvin Cheung
(74) *Attorney, Agent, or Firm* — Schwegman Lundberg & Woessner, P.A.

(57) ABSTRACT

Methods and systems are disclosed for controlling connected devices. For example, a messaging application implemented on a client device detects a real-world object depicted in a received image and determines a current location of the client device. The messaging application identifies a plurality of robotic cleaning devices associated with an account of the messaging application. The messaging application transmits a message comprising the current location of the client device to a first robotic cleaning device of the plurality of robotic cleaning devices and causes the first robotic cleaning device to clean the real-world object depicted in the received image based on the message transmitted by the messaging application.

20 Claims, 11 Drawing Sheets

(51) Int. Cl.
*G05D 1/00* (2006.01)
*G06V 20/10* (2022.01)
*H04L 51/10* (2022.01)
*H04L 51/222* (2022.01)
*H04L 67/306* (2022.01)

(52) U.S. Cl.
CPC ......... *H04L 67/306* (2013.01); *A47L 2201/04* (2013.01); *A47L 2201/06* (2013.01)

(56) References Cited

U.S. PATENT DOCUMENTS

| | | | |
|---|---|---|---|
| 8,554,250 B2 | 10/2013 | Linaker | |
| 8,843,245 B2 | 9/2014 | Choe et al. | |
| 8,924,019 B2 | 12/2014 | Tang | |
| 9,179,109 B1 | 11/2015 | Kasmir et al. | |
| 9,369,774 B2 | 6/2016 | Kumar | |
| 9,871,865 B2 | 1/2018 | Shaashua et al. | |
| 10,655,951 B1 | 5/2020 | Froment et al. | |
| 11,568,356 B1 | 1/2023 | Rochon et al. | |
| 2001/0034754 A1 | 10/2001 | Elwahab et al. | |
| 2011/0121940 A1 | 5/2011 | Jones | |
| 2012/0041925 A1 | 2/2012 | Pope et al. | |
| 2012/0270509 A1 | 10/2012 | Lewis | |
| 2013/0083193 A1 | 4/2013 | Okuyama et al. | |
| 2013/0093897 A1* | 4/2013 | Fan | H04N 23/80 348/E7.085 |
| 2015/0019714 A1 | 1/2015 | Shaashua et al. | |
| 2015/0130957 A1 | 5/2015 | Berelejis et al. | |
| 2015/0256689 A1 | 9/2015 | Erkkila et al. | |
| 2015/0347114 A1 | 12/2015 | Yoon | |
| 2016/0027207 A1* | 1/2016 | Hillen | G06T 7/74 348/207.1 |
| 2016/0139752 A1 | 5/2016 | Shim et al. | |
| 2016/0142758 A1* | 5/2016 | Karp | G08B 17/10 725/25 |
| 2016/0226732 A1 | 8/2016 | Kim et al. | |
| 2016/0274762 A1 | 9/2016 | Lopez et al. | |
| 2017/0019518 A1 | 1/2017 | Wang et al. | |
| 2017/0134553 A1 | 5/2017 | Jeon et al. | |
| 2017/0286046 A1 | 10/2017 | Pardi | |
| 2017/0359552 A1 | 12/2017 | Kobayashi | |
| 2018/0095628 A1 | 4/2018 | Choi | |
| 2019/0020809 A1 | 1/2019 | Pan | |
| 2019/0212752 A1* | 7/2019 | Fong | G06V 10/82 |
| 2019/0266886 A1* | 8/2019 | Jiang | H04W 4/021 |
| 2019/0320866 A1* | 10/2019 | Thorne | G05D 1/0033 |
| 2019/0361575 A1 | 11/2019 | Ni et al. | |
| 2019/0391716 A1 | 12/2019 | Badr et al. | |
| 2020/0022072 A1 | 1/2020 | Cho et al. | |
| 2020/0106835 A1 | 4/2020 | Deluca et al. | |
| 2020/0237176 A1* | 7/2020 | Bassa | G06F 18/2414 |
| 2021/0295046 A1 | 9/2021 | Gupta | |
| 2023/0136321 A1 | 5/2023 | Eirinberg et al. | |
| 2023/0152947 A1 | 5/2023 | Eirinberg et al. | |

OTHER PUBLICATIONS

"U.S. Appl. No. 17/532,430, Response filed Jul. 11, 2023 to Final Office Action mailed May 24, 2023", 10 pgs.
"U.S. Appl. No. 17/532,430, Notice of Allowance mailed Jul. 26, 2023", 5 pgs.
"U.S. Appl. No. 17/528,824, Final Office Action mailed Jan. 11, 2023", 29 pgs.
"U.S. Appl. No. 17/532,430, Response filed Feb. 22, 2023 to Non Final Office Action mailed Nov. 28, 2022", 9 pgs.
"International Application Serial No. PCT US2022 078668, International Search Report mailed Feb. 13, 2023", 5 pgs.
"International Application Serial No. PCT US2022 078668, Written Opinion mailed Feb. 13, 2023", 9 pgs.
"International Application Serial No. PCT US2022 048077, International Search Report mailed Feb. 28, 2023", 4 pgs.
"International Application Serial No. PCT US2022 048077, Written Opinion mailed Feb. 28, 2023", 4 pgs.
"LG's "Texting Appliances" Camera Fridge Coming To CES", Anonymous: XP093024325, [Online]. Retrieved from the Internet: https: reviewed.usatoday.com refrigerators news lg-unveils-smart-appliances-ahead-of-ces, (Oct. 18, 2015).
"U.S. Appl. No. 17/528,824, Response filed Mar. 8, 2023 to Final Office Action mailed Jan. 11, 2023", 11 pgs.
"U.S. Appl. No. 17/528,824, Advisory Action mailed Mar. 27, 2023", 3 pgs.
Chang, Yosun I, "Augmented reality interfaces for the internet of things: extended abstract", ACM Siggraph Appy Hour New York, NY, USA, (Aug. 12, 2018), 1-2.
"U.S. Appl. No. 17/528,824, Non Final Office Action mailed Sep. 7, 2022", 24 pgs.
"U.S. Appl. No. 17/528,824, Response filed Nov. 17, 2022 to Non Final Office Action mailed Sep. 7, 2022", 10 pgs.
"U.S. Appl. No. 17/532,430, Non Final Office Action mailed Nov. 28, 2022", 15 pgs.
"U.S. Appl. No. 17/528,824, Final Office Action mailed Dec. 19, 2023", 52 pgs.
"U.S. Appl. No. 17/528,824, Non Final Office Action mailed Aug. 30, 2023", 50 pgs.
"U.S. Appl. No. 17/528,824, Response filed Nov. 15, 2023 to Non Final Office Action mailed Aug. 30, 2023", 12 pgs.
"U.S. Appl. No. 17/532,430, Notice of Allowance mailed Nov. 8, 2023", 8 pgs.

* cited by examiner

POINT AND CLEAN

TECHNICAL FIELD

The present disclosure relates generally to controlling connected devices, such as Internet of Things (IoT) devices, using a messaging application.

BACKGROUND

As the popularity of social networking grows, social networks are expanding their capabilities. To improve ease of use, social networks are integrating more and more functions such that a user may accomplish many or even most of their computer-based tasks within the social network itself.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
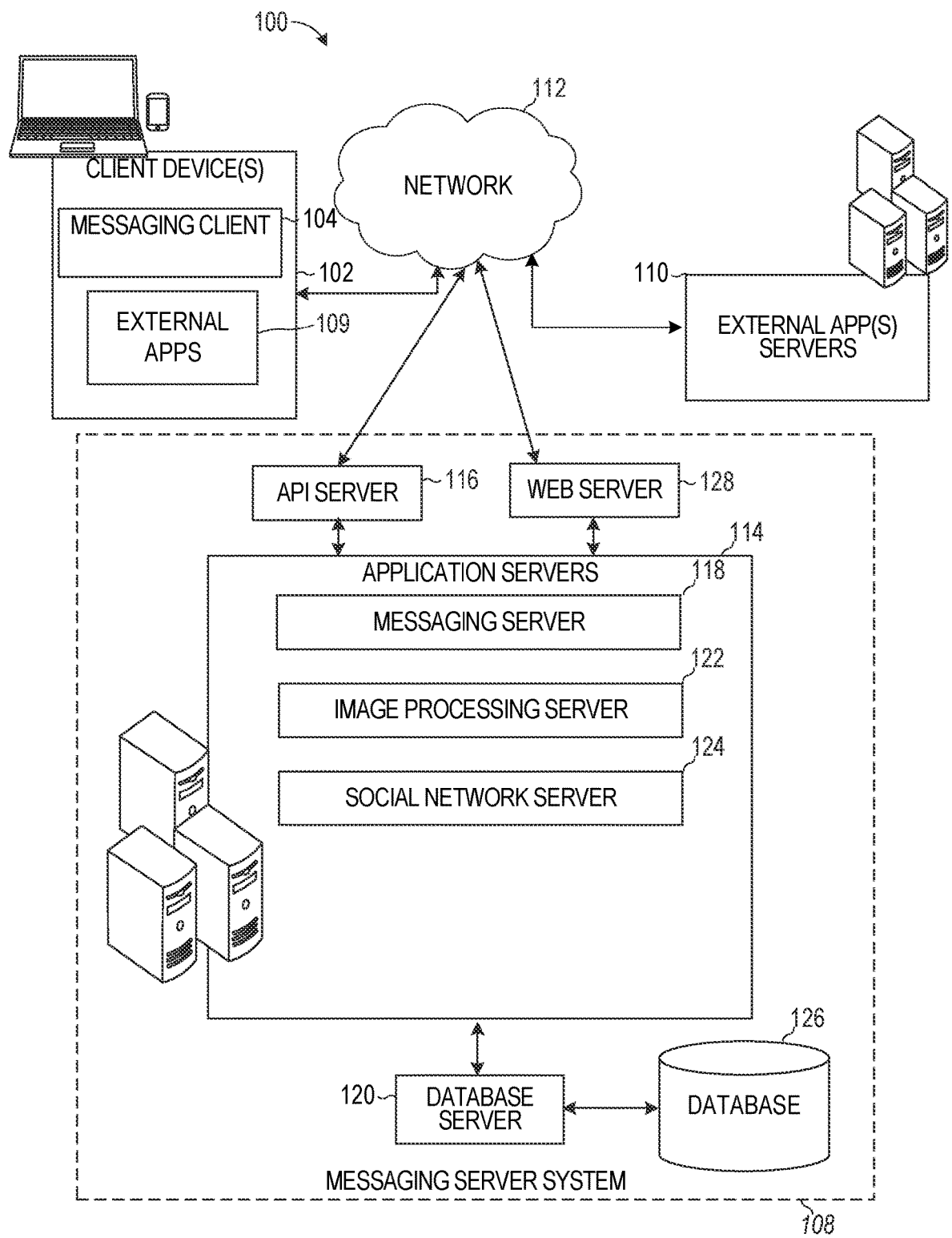
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, a mobile phone can be used to control various IoT devices in a user's home. To do so, a user has to preconfigure each of the IoT devices on the phone using complex setup procedures. For example, the mobile device can present a setup screen in which serial numbers, IP addresses and various other unique identifying information is input by a user for each IoT device they desire to control. Such information that is input is then used to establish an authenticated connection between the mobile device and the specified IoT device. In order to then control the specified IoT device, the user has to navigate through several screens and pages of information to find the particular icon or identifier of the IoT device. For example, the mobile device can present a folder structure of different IoT devices, such as robotic cleaning devices, and the user can navigate through the hierarchy of folders to find the desired device to control. This complex procedure to setup and control IoT devices can be very time consuming and onerous on the end users which takes away from the overall appeal of remotely controlling such devices using a mobile device. Also, the need to navigate a complex menu structure to control such devices can consume a great deal of resources.

Certain robotic cleaning device systems allow a user to manually select a robotic cleaning device to control over the Internet. The user can even instruct the robotic cleaning device to start a cleaning process. The robotic cleaning device can then map out a room and begin automated cleaning. While such systems generally work well, these systems sometimes miss certain soiled areas. These systems provide no mechanism for a user to instruct the cleaning device to clean a particular area of interest in a simple and efficient manner. To clean a desired area, the user can be presented with a predetermined map of an area and the user can then select a region to clean. However, such a map is not intuitive to interact with and can be difficult to use to identify and select a particular area that may be soiled. In many cases, the users have to wait for the robotic cleaning device to detect the soiled area of interest by itself through routine operations, and even then the robotic cleaning device can miss the soiled area of interest. This can result in the robotic cleaning device wasting battery power and resources cleaning areas that need not be cleaned or that are not soiled. This can also frustrate users, which can lead to lack of use and waste of resources.

The disclosed techniques improve the efficiency of using the electronic device to control connected devices, such as IoT devices including robotic cleaning devices, by using a messaging application to automatically recognize real-world objects associated with connected devices in one or more images captured by the electronic device and then enabling control of the connected devices. Namely, the disclosed examples provide a messaging application implemented on a client device that detects a real-world object depicted in a received image and determines a current location of the client device. The messaging application identifies a plurality of robotic cleaning devices associated with an account of the messaging application. The messaging application transmits a message comprising the current location of the client device to a first robotic cleaning device of the plurality of robotic cleaning devices and causes the first robotic cleaning device to clean the real-world object depicted in the received image based on the message transmitted by the messaging application.

In this way, the disclosed techniques provide a simple and intuitive way for users to interact with robotic cleaning devices to clean a desired area. Namely, the disclosed techniques allow a user to capture an image of a soiled area using a messaging application and automatically communicate with a suitable robotic cleaning device to clean the specific soiled area depicted in the image. As a result, a specific area of interest can be identified (manually or automatically) in an image captured by a camera of the client device and used to instruct the robotic cleaning device to clean only that specific area. This reduces the overall amount of resources required to control connected devices and increases the overall appeal of using the messaging application.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
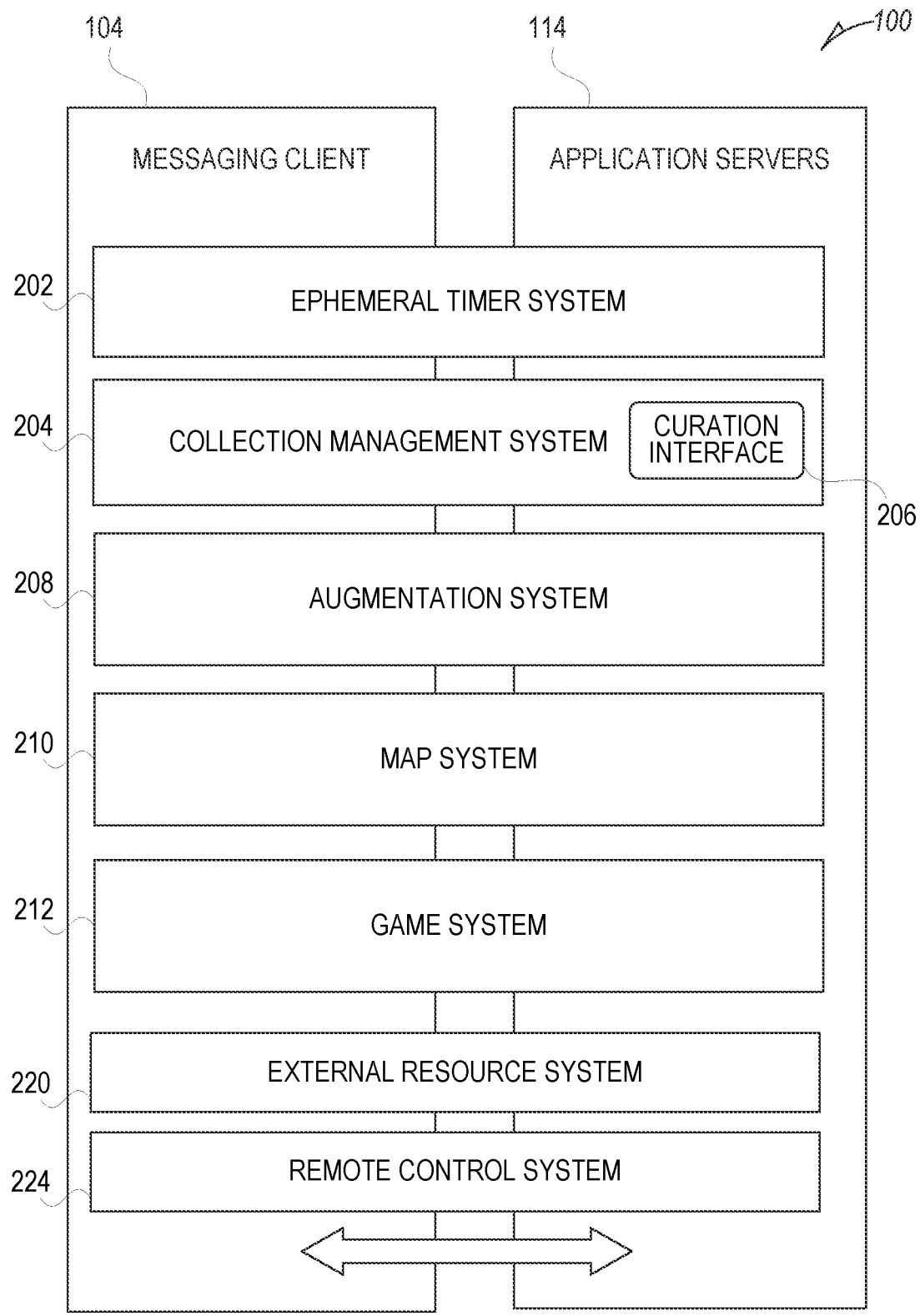
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality (AR) experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification. The image processing server 122 can receive a video and/or one or more images captured by the client device 102. The image processing server 122 can perform feature analysis and object recognition on the received video and/or one or more images to identify and detect one or more real-world objects that are depicted in the received video and/or images. The image processing server 122 can access features and/or attributes of each real-world object that is detected from a database or by searching the Internet. In response to detecting the real-world objects, the image processing server 122 can generate a list of identifiers of real-world objects being depicted in the video and/or images and can associate the one or more attributes or features with each object in the list.

In some cases, the image processing server 122 can process features depicted in an image or video to identify a soiled area of a physical real-world environment. The image processing server 122 can identify the soiled area by applying a trained neural network to the image or video. The image processing server 122 can display a virtual element or augmented reality element on top of the image or video to identify each soiled area. In another implementation, the image processing server 122 can automatically control a robotic cleaning device to approach the soiled area that is identified and apply a suitable cleaning process to clean the soiled area.

Figure 3:
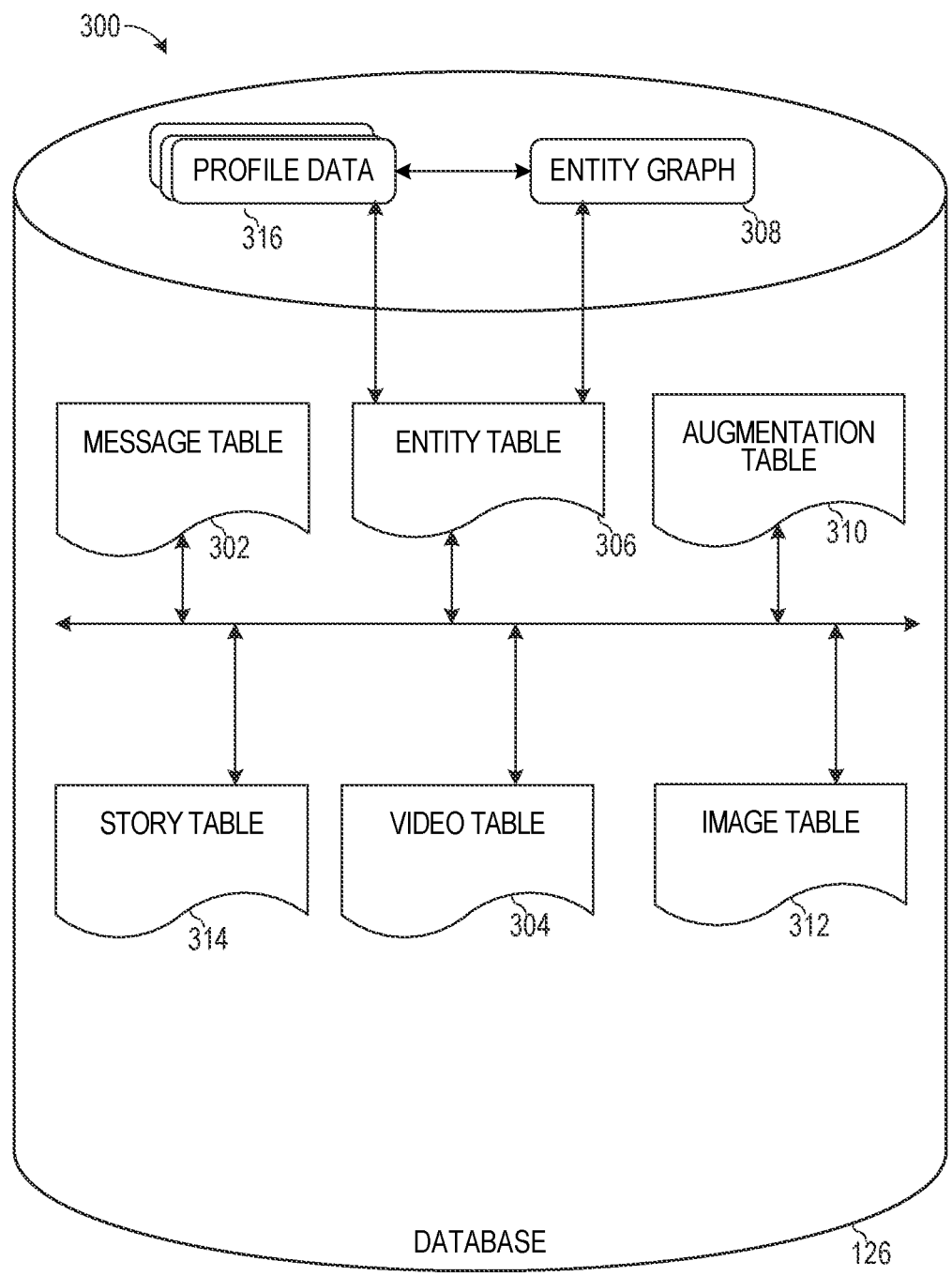
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app") or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

In some examples, the messaging client 104 can present a remote control setup interface. The remote control setup interface allows the user to scan and capture images and/or videos of various rooms in a home, household, office, restaurant, or any other physical location. In one example, the messaging client 104 can receive input that specifies a current physical location of the client device 102. The current physical location can identify an entire home or a particular room in the home, such as the living room. In response to receiving the input that specifies the current physical location (e.g., including a textual or visual identifier of the physical location, such as a room name or type), the messaging client 104 processes the images and/or videos to identify a set of real-world objects depicted in the images and/or videos. For example, the messaging client 104 can instruct the user to walk around the physical location to capture a video of the entire location, such as a 360-degree video. This way, any real-world object that is at the current physical location can be represented in the captured video and identified by the messaging client 104, such as by performing one or more object recognition techniques or processes. The messaging client 104 can automatically associate each of the real-world objects with the current physical location (e.g., the room name or type) and with their respective previously registered IoT device.

In some implementations, the messaging client 104 obtains from a remote server, such as a particular product manufacturer, a list of IoT devices (e.g., robotic cleaning devices, such as robotic vacuum cleaners, robotic pet hair removal devices, robotic mops, robotic window cleaners, robotic pool cleaner, robotic litter box cleaner, robotic gutter cleaner, and so forth) that have previously been registered to an account associated with the client device 102. Namely, the messaging client 104 can receive input from the user that provides an account identifier (e.g., username and password) for IoT devices of one or more product manufacturers. The messaging client 104 accesses a website or database or manufacturer server associated with the one or more product manufacturers based on the account identifier. The messaging client 104 obtains, from the website or database or manufacturer server, IoT devices that are associated with the account identifier and indicated to be currently active in the user's account.

Example IoT devices can include a list of connected robotic cleaning devices. A connected robotic cleaning device includes a stationary or non-stationary device that can include wheels or other movement mechanism and is configured to detect soiled areas and clean, disinfect, and/or remove or repair the soiled portion of the area. The connected robotic cleaning device can include an on-board camera which captures a video feed of a target area as the robotic cleaning device moves around. When the connected robotic cleaning device approaches an area captured by the video feed, the connected robotic cleaning device can apply one or more mechanisms to clean, disinfect, and/or remove or repair the soiled portion of the area. In some cases, the robotic cleaning devices operate on a schedule and follow a path to clean a portion of a household. The robotic cleaning devices can include one or more sensors to avoid obstacles. As referred to herein, a "soiled" area includes a physical region that has wet and/or dry particles or substances that are undesirable or unclean, such as dirt, bacteria, virus, or spillage. For example, a soiled area is a wet or dirty area.

The messaging client 104 can obtain unique features or attributes of each of the IoT devices that are obtained from the website or database. In one example, the messaging client 104 can search the unique features or attributes of each IoT device in the list received from the website or database based on the features or attributes of the real-world objects identified in the video or images of the current physical location. For example, the IoT device can include a television object with certain visual attributes, such as a size, dimensions, and color. The messaging client 104 can compare the visual attributes of the television real-world object detected in the video or images captured at the current physical location to the visual attributes of the television object on the list. The messaging client 104 can determine that the video or images captured at the current physical location include visual attributes that match a set of visual attributes of a respective set of IoT devices in the list. In response, the messaging client 104 can determine that the current location includes the set of IoT devices in the list. The messaging client 104 can associate each IoT device of the set with the current physical location (e.g., a GPS coordinate or range of GPS coordinates or the room name or type input by the user).

In one example, the messaging client 104 can present a list of robotic cleaning devices that are obtained from the website or database or manufacturer server to the user. The messaging client 104 can receive input from the user that associates each robotic cleaning device with a set of visual attributes (e.g., corresponding to different soiled portion types) and/or locations. For example, the messaging client 104 can receive input that associates a vacuum robotic cleaning device with a first portion of a home (e.g., a living room) and with dry particles as the soiled portion. As another example, the messaging client 104 can receive input that associates a wet vacuum or mop robotic cleaning device with the first portion of a home and with wet particles as the soiled portion. As another example, the messaging client 104 can receive input that associates a second vacuum robotic cleaning device with a second portion of a home (e.g., one or more bedrooms) and with dry particles and pet hair as the soiled portion. The messaging client 104 can store in the database an association between features or attributes of the soiled portion types and GPS or location information of each specified physical location with each respective robotic cleaning device.

In an example, the messaging client 104 can detect a soiled portion of a real-world object in an image or video and obtain location information associated with the image or video. In response, the messaging client 104 can select a robotic cleaning device that is associated with the location information and that is associated with the soiled portion type that is identified in the image or video. The messaging client 104 can communicate automatically with the selected robotic cleaning device to provide a message that specifies the location of the soiled portion of the real-world object depicted in the image or video and instructs the robotic cleaning device to move to the location to clean the soiled portion of the real-world object. The messaging client 104 can include visual attributes that represent the real-world object depicted in the image or video and/or visual attributes of the soiled portion of the image. For example, the messaging client 104 can receive an image that depicts a rug with dirt or a stain. The messaging client 104 can determine that the image was captured in a location corresponding to a living room. The messaging client 104 can determine that the depicted rug includes a soiled portion (e.g., the dirt or stain) and can select a dry robotic vacuum cleaning device that is associated with the living room and is associated with the type of soiled portion corresponding to the dirt or stain. The messaging client 104 can instruct the dry robotic vacuum cleaning device to approach or move to the living room location and clean the dirt or stain from the rug.

In an example, the messaging client 104 can receive input from a user that selects a soiled portion of an image or video captured by a camera of the client device 102. In response, the messaging client 104 obtains location information associated with the image or video and generates one or more visual attributes of the selected soiled portion of the image or video. The messaging client 104 can select a robotic cleaning device that is associated with the location information and that is associated with the soiled portion type that is identified in the image or video based on processing the visual attributes of the selected soiled portion. The messaging client 104 can communicate automatically with the selected robotic cleaning device to provide a message that specifies the location of the soiled portion selected by the user from the image or video and instructs the robotic cleaning device to move to the location to clean the soiled portion. The messaging client 104 can include the visual attributes of the selected soiled portion of the image or video.

In one example, the dry robotic vacuum cleaning device receives the message and moves to the location automatically. Once the dry robotic vacuum cleaning device reaches the location (e.g., the living room), the dry robotic vacuum cleaning device turns on a video camera to search for a real-world object that matches one or more visual attributes of the real-world object depicted in the image or video (e.g., the rug). The dry robotic vacuum cleaning device can move about the location in 360 degrees until the visual attributes of real-world objects captured by the camera of the dry robotic vacuum cleaning device match the visual attributes of the real-world object depicted in the image captured by the messaging client 104 or the visual attributes of the soiled portion selected by the user from the image or video. In response to determining that the video includes attributes that match the visual attributes of the real-world object received from the messaging client 104 or the soiled portion selected by the user, the dry robotic vacuum cleaning device automatically navigates to and moves to the location corresponding to the video and cleans the area corresponding to the video captured by the camera of the dry robotic vacuum cleaning device.

In some implementations, the messaging client 104 can obtain an API from the one or more manufacturers that enables remote control of the set IoT devices (e.g., connected video cameras) associated with the one or more manufacturers. The messaging client 104 can use the API to enable remote control of the set of IoT devices, such as to instruct robotic cleaning devices to move to and clean a particular area. Specifically, the messaging client 104 can associate the soiled portion types and/or locations with a given set of the connected robotic cleaning devices and can also associate the API of the given set of connected robotic cleaning devices with the specified locations and/or soiled portion types. In this way, whenever an image of a soiled portion of a real-world object is captured at the current physical location, the messaging client 104 can automatically obtain the API associated with the IoT device (e.g., the robotic cleaning device) associated with the depicted soiled portion of the real-world object to instruct the robotic cleaning device to clean the area corresponding to the soiled portion, such as by transmitting one or more commands to the IoT device over a local shared or common wireless network (e g., a local area network or wide area network). For example, whenever an image of the real-world object is captured at the current physical location, the messaging client 104 can automatically obtain the API associated with the robotic cleaning device corresponding to a soiled portion type and the current physical location and instruct the robotic cleaning device to clean the current physical location.

The process of associating such robotic cleaning devices with specific locations and/or soiled portion types with their respective APIs to enable remote control of robotic cleaning devices can be repeated for multiple physical locations. For example, the messaging client 104 can instruct the user to move to a new physical location, such as a new room in a home, and repeat the process of scanning a video or images that depict one or more real-world objects at that new physical location. The messaging client 104 can associate each of the real-world objects with the new physical location. In this way, when an image of such real-world objects is captured and received in the future, the messaging client 104 can determine the current location (e.g., without accessing GPS information). The messaging client 104 can search a list of previously registered robotic cleaning devices to enable the user to associate the robotic cleaning devices or a subset thereof with the new physical location and/or with a soiled portion type.

In some examples, the messaging client 104 can receive a user request to clean an area at a particular physical location. In response, the messaging client 104 can activate a rear-facing or front-facing camera of the client device 102. The messaging client 104 can instruct the user to point the camera at the real-world object of interest the user would like to clean or which includes a soiled portion. The messaging client 104 can capture an image or images of the real-world object of interest, such as when the user selects an option indicating that the real-world object of interest with the soiled portion is currently depicted in the image or images. The messaging client 104 can perform object recognition on the received image or images to generate a list of identified objects and their respective features.

The messaging client 104 can access a database based on the particular physical location. For example, the messaging client 104 can obtain a current set of GPS coordinates. The messaging client 104 can identify in the database a set of GPS coordinates that are within a certain threshold proximity or range (e.g., within 10 meters) of the current set of GPS coordinates. In response to identifying the set of GPS coordinates that are within the certain threshold proximity to the current set of GPS coordinates, the messaging client 104 obtains the list of robotic cleaning devices associated with the set of GPS coordinates. The messaging client 104 compares one or more attributes of the real-world object currently depicted in the image or images with the attributes associated with the soiled portion types stored in the database. For example, the messaging client 104 can compare attributes of a real-world rug having dirt with the attributes associated with a dirt soiled portion type to determine the soiled portion type of the rug depicted in the image. The messaging client 104 can then select, from the list of robotic cleaning devices associated with the set of GPS coordinates, a given robotic cleaning device that is associated with the determined soiled portion type. In response to identifying the given robotic cleaning device, the messaging client 104 can access the API of the given robotic cleaning device.

In one example, the messaging client 104 uses the accessed API to instruct the given robotic cleaning device to move to and clean the area associated with the GPS coordinates. In an implementation, the messaging client 104 generates a graphical user interface that includes a command to clean the area depicted in the image and instructs the robotic cleaning device in response to receiving input that selects the command. In another example, the messaging client 104 communicates an identifier of the IoT device to a manufacturer server of the robotic cleaning device. The manufacturer server then selects a cleaning command to transmit to the robotic cleaning device. The cleaning command issued to the robotic cleaning device can include the GPS coordinates and a set of visual attributes of a soiled portion of the image (e.g., an automatically selected soiled portion or soiled portion specified by the user, such as by dragging a cleaning visual element over a given region of the image).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A remote control system 224 provides an interface for detecting real-world objects in a captured image that are soiled and identifying one or more robotic cleaning devices corresponding to the soiled portions of the real-world objects. The remote control system 224 presents a user interface to select a soiled portion of an image or video. The remote control system 224 communicates with a selected one of the identified robotic cleaning devices to instruct the identified robotic cleaning device to move to an clean the soiled portion of the real-world object depicted in the image. An illustrative implementation of the remote control system 224 is shown and described in connection with FIG. 5 below.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

In some examples, the AR content items include a cleaning indicator that can be interacted with by a user to move to a portion of an image that a user desires to have cleaned. The remote control system 224 determines a real-world location associated with the cleaning indicator and instructs a suitable robotic cleaning device to move to and clean a real-world environment corresponding to the real-world location.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
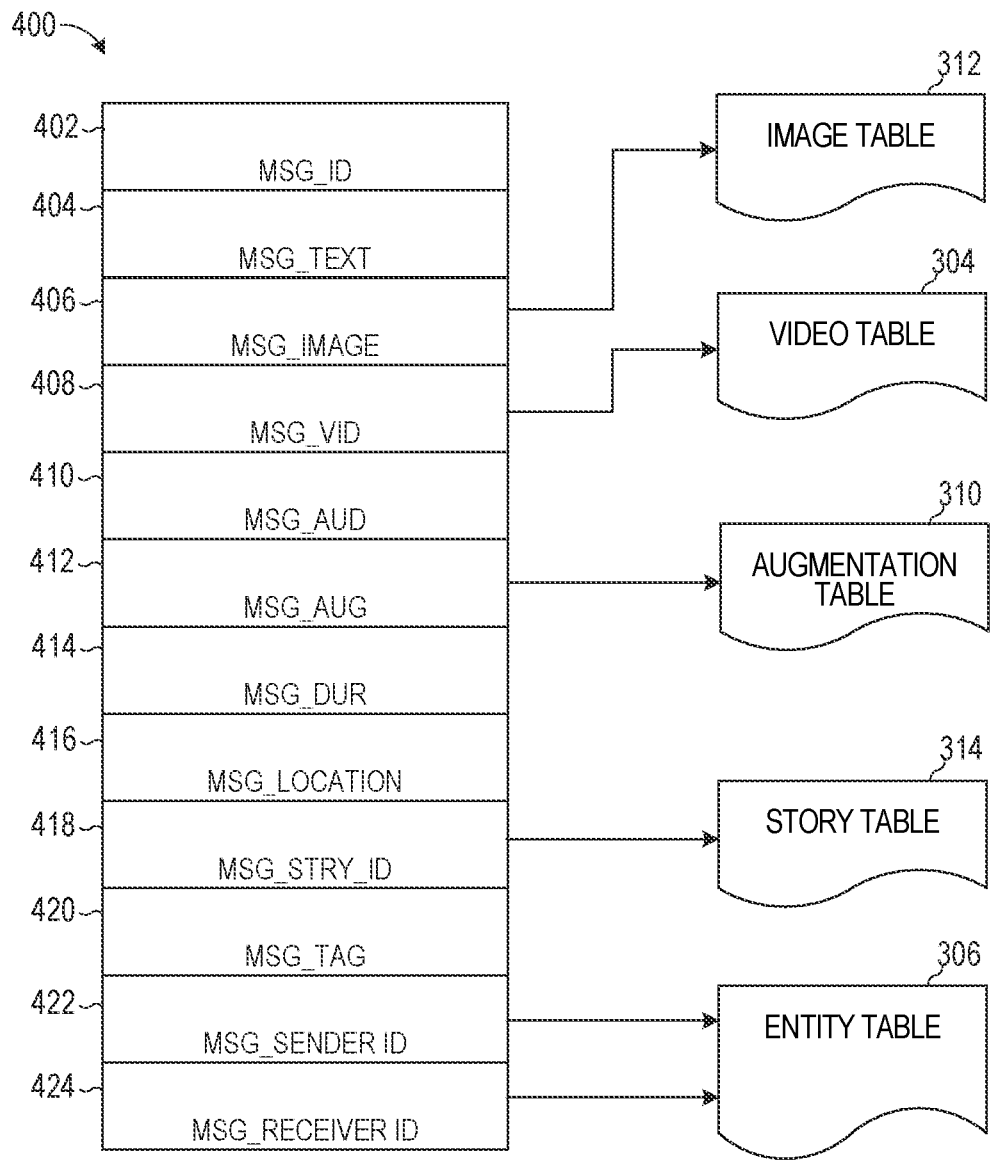
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Remote Control System

Figure 5:
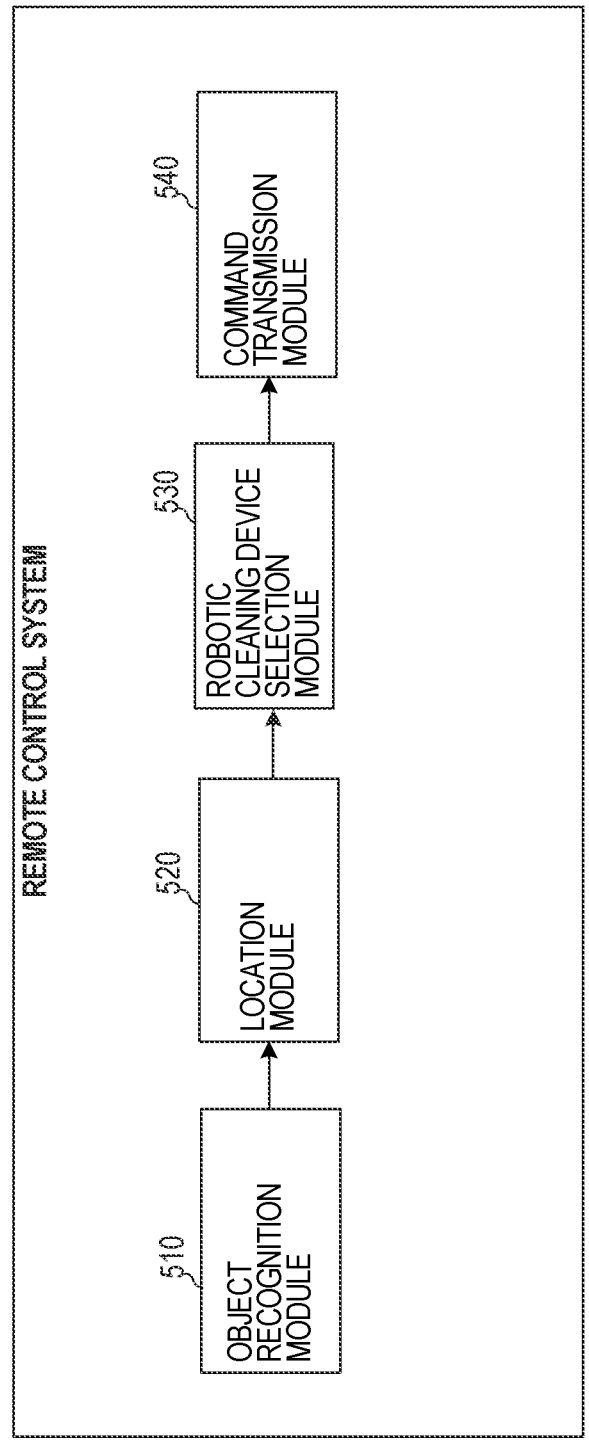
FIG. 5 is a block diagram showing an example remote control system, according to example examples.

FIG. 5 is a block diagram showing an example remote control system 224, according to some examples. Remote control system 224 includes a set of components that operate on a set of input data. The remote control system 224 includes an object recognition module 510, a location module 520, a robotic cleaning device selection module 530, and a command transmission module 540.

In one example, the object recognition module 510 receives an image or video that depicts one or more real-world objects. The object recognition module 510 performs object recognition on the received image or video to obtain one or more features or attributes of the real-world objects. The object recognition module 510 uses the features or attributes to generate a list of unique real-world objects, such as a television, front door, side of a wall, ceiling, refrigerator, rug, electronic door lock, a table, a thermostat, a sound system, a light bulb, an oven, a kitchen appliance, or any other suitable real-world object. For example, the object recognition module 510 can apply one or more trained neural networks to identify particular objects or regions of interest that depict real-world objects. The trained neural network can be trained using training images that depict various types of real-world objects along with ground-truth information that details the portions of the images that include the real-world objects and the types of the objects.

In one example, the object recognition module 510 can detect a soiled portion of the real-world object depicted in the image. Specifically, the location module 520 can apply a trained neural network to the real-world object depicted in the image to identify particular regions of interest that depict soiled portions and that provide identification of the soiled portion types. The trained neural network can be trained using training images that depict various types of soiled portions of real-world objects along with ground-truth information that details the portions of the images that include the soiled portions and the types of the soiled portions. The neural network can be trained using regression and back propagation. Namely, the neural network can perform a first prediction of a soiled portion of a training image and soiled portion type. The first prediction can be compared with the ground truth soiled portion region and soiled portion type. Based on a deviation between the first prediction and the ground truth information, parameters of the neural network can be updated. The neural network with the updated parameters is again applied to another training image to generate a second prediction. The parameters are again updated based on a deviation associated with the second prediction and the respective ground truth information. The process of training in this way continues until a stopping criterion, such as maximum number of interactions is reached or the deviation is within a specified threshold.

In another example, the object recognition module 510 can receive input from a user that drags a visual identifier (e.g., an augmented reality element) over a region of an image or video of interest. The region of the image or video of interest can be a portion of a real-world environment the user has an interest in having cleaned. The object recognition module 510 can recognize the soiled portion type of the region selected by the user. In another implementation, the object recognition module 510 can receive input from a user that selects a soiled attribute corresponding to the selected portion of the image. In another implementation, the object recognition module 510 presents a list of possible soiled portion types and the user provides input that selects one or more soiled attribute types from the list.

The object recognition module 510 provides the list of real-world objects to the location module 520. The location module 520 can access current physical location information of a client device 102 that captured the image or video. For example, the location module 520 can obtain the current GPS coordinates of the client device 102. The location module 520 provides the current GPS coordinates of the client device 102 along with the list of real-world objects depicted in the image or video to the robotic cleaning device selection module 530. In some cases, rather than using GPS coordinates of the client device 102, the location module 520 can access a database that previously associated the detected real-world objects with a given location. The location module 520 can retrieve or determine the given location that is associated with the real-world objects detected in the received image or video, such as by matching one or more visual attributes of the real-world objects with visual attributes associated with one or more physical locations. The location module 520 can then provide that given location to the robotic cleaning device selection module along with one or more visual features of the soiled portion of the image that depicts the real-world object. The location module 520 can also provide the identification of the soiled portion type depicted in the received image.

Figure 6:
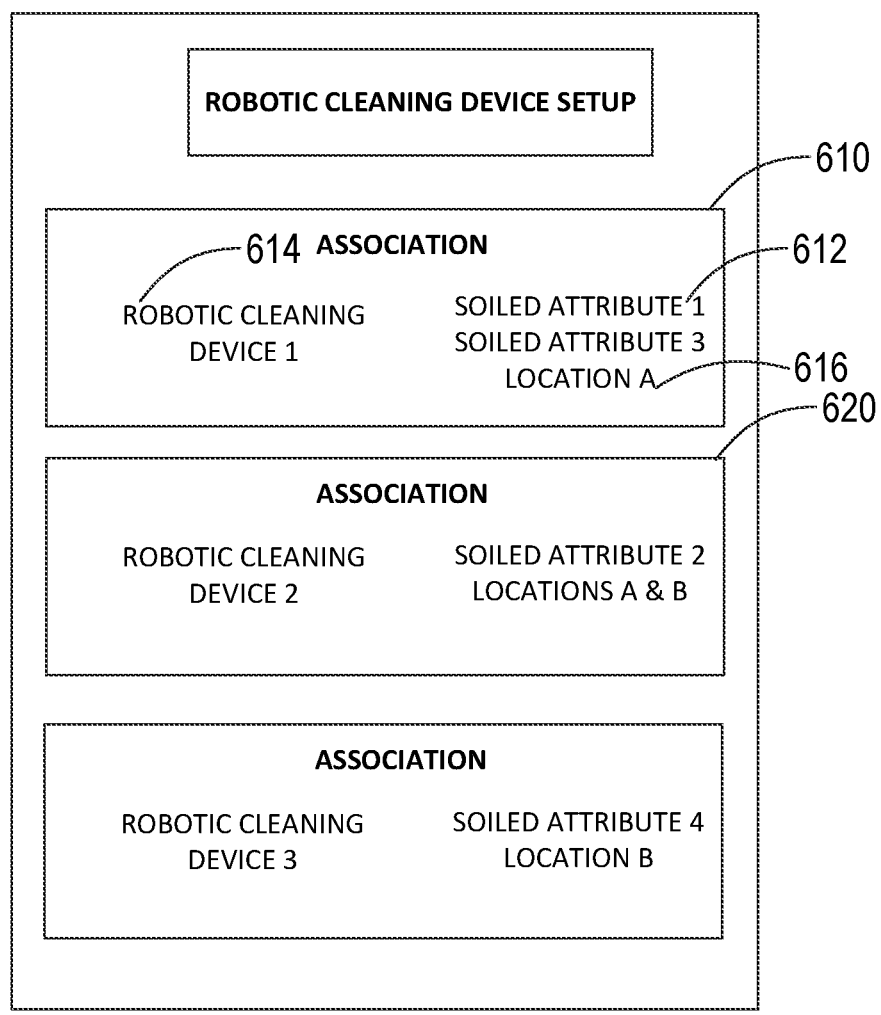
FIGS. 6, 7, and 8 are diagrammatic representations of outputs of the remote control system, in accordance with some examples.

The robotic cleaning device selection module 530 accesses a database of previously registered IoT devices (e.g., robotic cleaning devices) associated with the client device 102. For example, the robotic cleaning device selection module 530 can be preconfigured by the user to associate different robotic cleaning devices with their respective physical locations, types of soiled portions, and corresponding APIs for controlling the robotic cleaning devices. For example, the robotic cleaning device selection module 530 can present a setup screen 600, as shown in FIG. 6. The setup screen 600 allows a user to associate different robotic cleaning devices with respective location(s) and soiled attribute(s). Specifically, the setup screen 600 includes a list of various robotic cleaning devices determined to be previously registered to an account associated with the user. The setup screen 600 includes a first association region 610 and a second association region 620. Each of the first association region 610 and the second association region 620 defines parameters for automatically controlling respective robotic cleaning devices.

For example, the first association region 610 includes an identifier of a first robotic cleaning device 614 (e.g., a vacuum robotic cleaning device). The first robotic cleaning device 614 can be selected by a user from an interactive list of available robotic cleaning devices associated with the user's account. The first association region 610 includes a soiled attribute selection region 612. The soiled attribute selection region 612 is configured to receive input from a user that selects one or more soiled attributes (soiled types of regions, such as dry dirt, wet dirt, pet hair, and so forth). The first association region 610 is also configured to receive input from the user that selects one or more locations 616 to associate with the first robotic cleaning device 614. Namely, the first association region 610 can access various locations previously stored by the location module 520 and can present such locations in a menu to a user. The first association region 610 receives a user selection of one or more of the locations. In response, the first association region 610 associates the first robotic cleaning device 614 with the soiled attributes specified in the soiled attribute selection region 612 and the one or more locations 616 specified by the user.

The setup screen 600 is configured to receive input in a similar manner in connection with the second association region 620. Namely, the second association region 620 associates a second robotic cleaning device with respective soiled attributes specified in a soiled attribute selection region of the second association region 620 and one or more locations specified in the second association region 620. In some cases, multiple different types of robotic cleaning devices are associated with a same set of locations or overlapping set of locations but with different soiled attributes. For example, a living room location can be associated with a dry vacuum robotic cleaning device and a mop cleaning device. The dry vacuum robotic cleaning device can be associated with a dry soiled attribute and the mop cleaning device can be associated with a wet soiled attribute. The parameters defined in the setup screen 600 are stored in a database, locally or remotely.

Referring back to FIG. 5, the robotic cleaning device selection module 530 searches the database of previously registered robotic cleaning devices using the current GPS coordinates or location information received from the location module 520 (e.g., the living room or bedroom). Namely, the robotic cleaning device selection module 530 can search for GPS coordinates stored in the database that are within a threshold proximity (e.g., 10 meters) of the current GPS coordinates. In response to identifying such GPS coordinates stored in the database, the robotic cleaning device selection module 530 can retrieve a list of previously registered robotic cleaning devices associated with the identified GPS coordinates or with the location information.

The robotic cleaning device selection module 530 can access the soiled attributes associated with each previously registered robotic cleaning device from the list. The robotic cleaning device selection module 530 can compare the soiled attributes associated with each identified robotic cleaning device corresponding to the current location with the soiled type of the region of the image determined by the object recognition module 510. In response, the robotic cleaning device selection module 530 can select a given robotic cleaning device that is associated with soiled attribute type(s) that match the soiled type of the region of the captured image or video determined by the object recognition module 510 and/or specified by the user.

Figure 7:
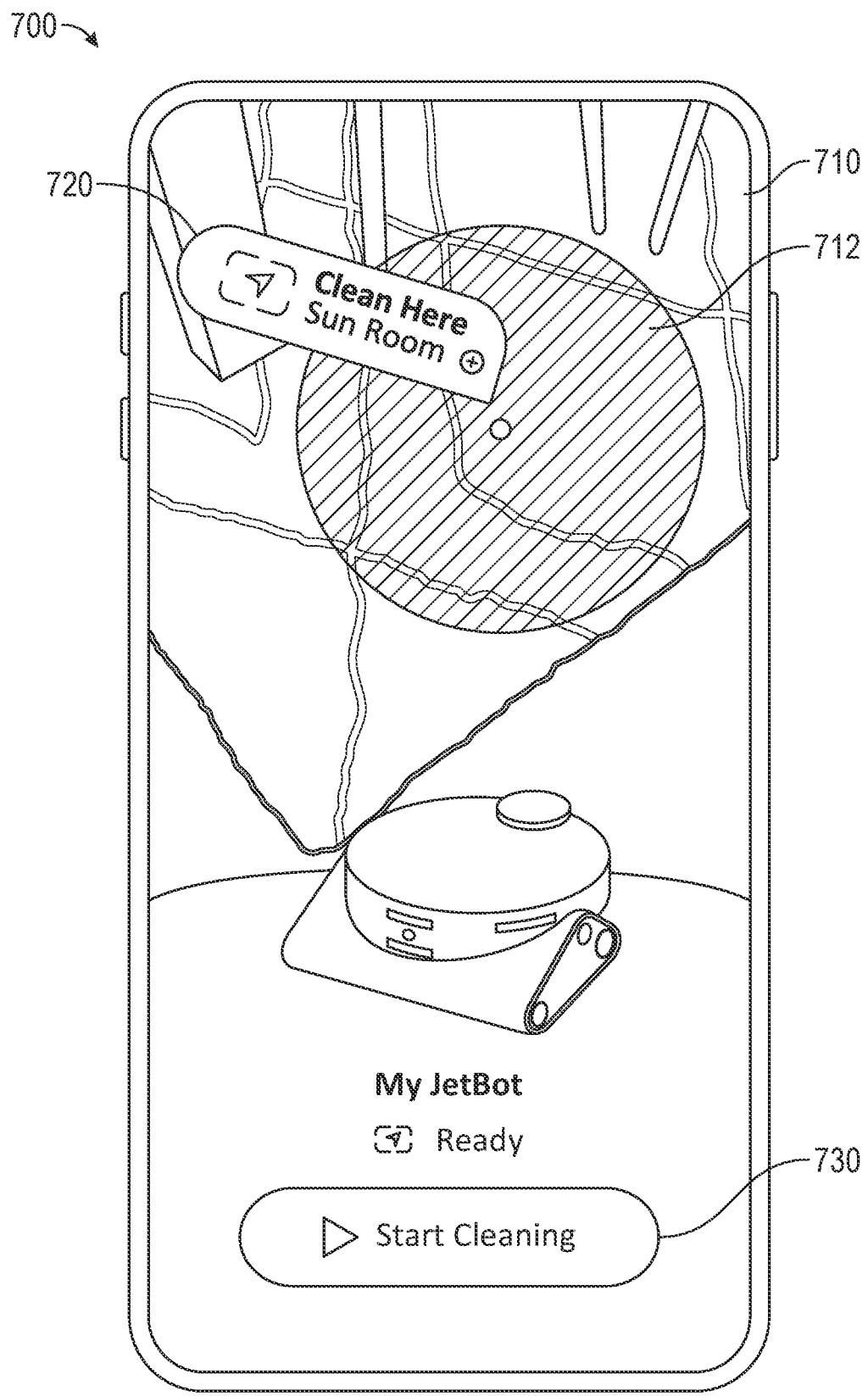

For example, as shown in FIG. 7, a user interface 700 is presented on a client device 102 that includes an image depicting a real-world environment. The object recognition module 510 detects a rug real-world object 710 that includes a soiled portion 722. In one example, the object recognition module 510 can present an augmented reality element (e.g., a circle region) that a user can drag over to identify the soiled portion 722. The object recognition module 510 can present a notification 720 with an option to specify a type of the soiled portion 722 and that identifies the current location (as determined by the location module 520). The notification 720 can be presented in response to detecting a soiled portion 722 of the rug real-world object 710 depicted in the image. The soiled portion type presented in the notification 720 can be automatically determined (e.g., via the trained neural network) or specified by the user.

The robotic cleaning device selection module 530 can determine that multiple robotic cleaning devices are associated with the current location of the client device 102 or associated with the location corresponding to the rug real-world object 710 depicted in the image. In such cases, the robotic cleaning device selection module 530 can determine that the soiled attributes of the soiled region of the rug real-world object 710 matches one or more soiled attributes associated with a given one of the robotic cleaning devices associated with the current location. For example, the robotic cleaning device selection module 530 can determine that a dry vacuum robotic cleaning device that has previously been registered at the current location (e.g., a entryway or living room) is associated with dry soiled attributes of the soiled rug real-world object 710 and that a wet vacuum robotic cleaning device is not associated with the those dry soiled attributes but is associated with the current location.

In response to identifying the given robotic cleaning device, the robotic cleaning device selection module 530 can present in the user interface 700 a representation of the given robotic cleaning device (e.g., a picture, name, image, video or animation representing the given robotic cleaning device). The robotic cleaning device selection module 530 can obtain a command for controlling the given robotic cleaning device (e.g., start cleaning command 730) and present the command in the user interface 700. In response to receiving a user selection of the command 730, the robotic cleaning device selection module 530 can communicate with the command transmission module 540 to transmit a message with an instruction to clean the current location associated with the image that depicts the rug real-world object 710. The message can include visual attributes of the soiled portion 722 and location information (e.g., GPS coordinates or an identifier of a room in a home).

The robotic cleaning device selection module 530 can communicate with the given robotic cleaning device to obtain a current state or status information. The robotic cleaning device selection module 530 can render a notification in the user interface 700 that indicates the current status or state.

In one example, the command transmission module 540 accesses the API associated with the given robotic cleaning device. The command transmission module 540 obtains one or more instructions from the API corresponding to the clean command. The command transmission module 540 uses the instructions to send a message including the instructions over a local area network to the robotic cleaning device to clean the area corresponding to the soiled portion 722. In an example, the command transmission module 540 obtains the IP address associated with the robotic cleaning device from the list of previously registered robotic cleaning devices. The command transmission module 540 generates a data packet for transmission to the IP address including the one or more instructions obtained from the API. The robotic cleaning device receives the data packet and obtains the instructions stored in the data packet. The robotic cleaning device then executes the instructions, such as to physically move to the location and clean the soiled area, in response to obtaining the instructions stored in the data packet.

In some examples, to enhance security, rather than sending a packet directly to the robotic cleaning device with the instructions, the command transmission module 540 can send an identifier of the robotic cleaning device (e.g., a serial number or IP address) to a manufacturer server associated with the robotic cleaning device. The command transmission module 540 also provides the particular command that has been selected and the location and the visual features of the soiled portion 722. The manufacturer server associated with the robotic cleaning device then processes the command to generate an instruction. The manufacturer server associated with the robotic cleaning device sends the instruction over the Internet to the robotic cleaning device to cause the robotic cleaning device to execute the instruction, such as to clean the area.

In this way, the user is able to point a camera of the client device 102 towards a target real-world object. In response, the remote control system 224 can identify the target real-world object and search for a previously registered robotic cleaning device that can clean a soiled portion (e.g., soiled portion 722) corresponding to the target real-world object. The remote control system 224 can then seamlessly send a command to control a robotic cleaning device to clean the soiled portion.

Figure 8:
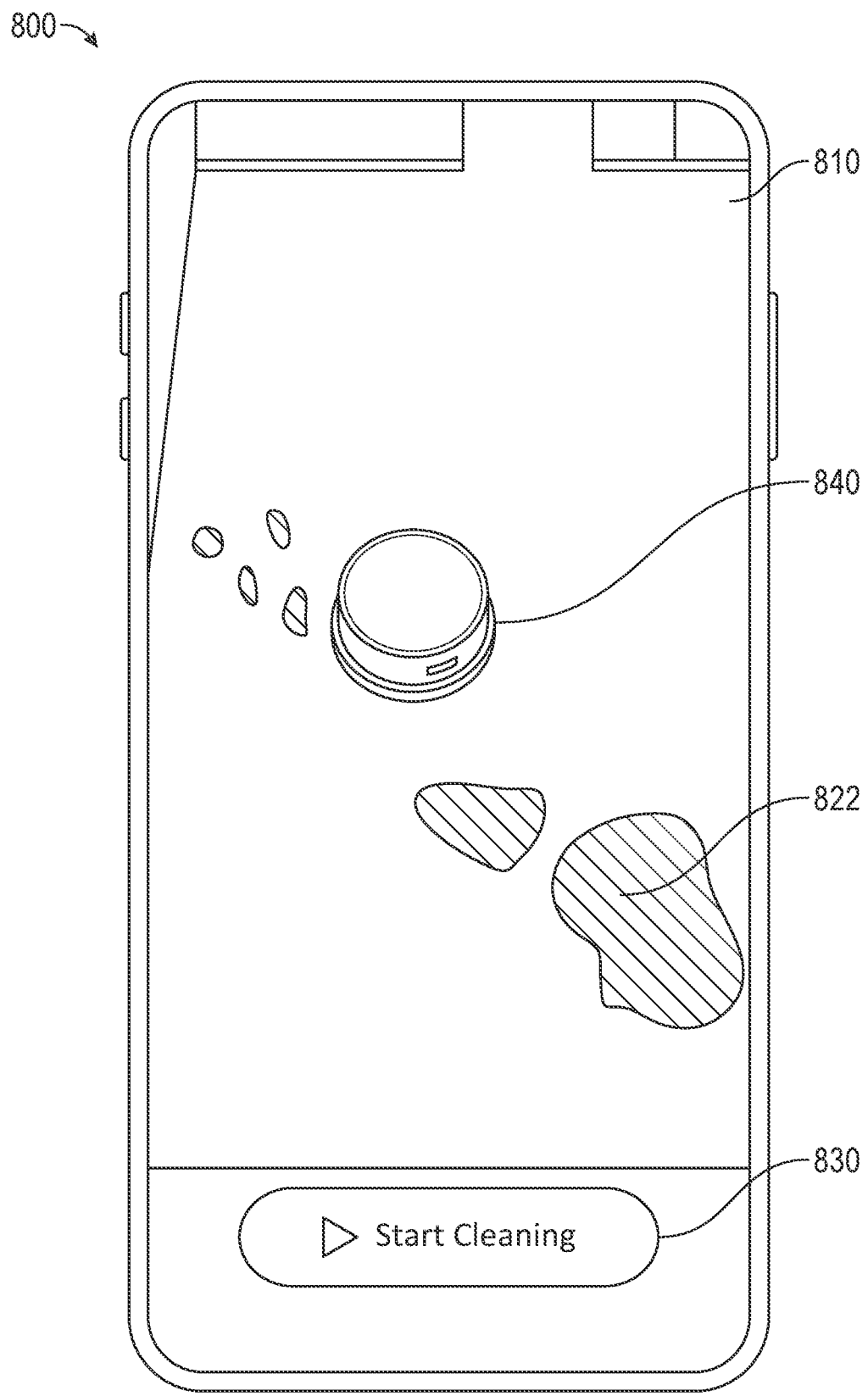

As shown in FIG. 8, a video or an image 810 is presented in a user interface 800 depicting the given robotic cleaning device 840 which has received the command to clean the soiled portion of the real-world object. Specifically, the video or image 810 depicts a soiled portion 822. The given robotic cleaning device 840 navigates to and moves to the location corresponding to the soiled portion 822 based on the location information received in the message from the command transmission module 540. In order to specifically identify the region that needs to be cleaned, the given robotic cleaning device 840 activates an on-board camera when the given robotic cleaning device 840 reaches a threshold proximity of the location received in the message. In one example, when the given robotic cleaning device 840 reaches the threshold proximity of the location received in the message, a confirmation notification 830 is presented to the user. The confirmation notification 830 includes a start cleaning option. In response to receiving input that selects the start cleaning option, the given robotic cleaning device 840 begins searching for areas to clean that have soiled portions.

In one example, in response to receiving input that selects the start clean option, the command transmission module 540 transmits (directly or indirectly) a further message to the given robotic cleaning device 840 to begin capturing images from the camera and detect soiled portions of a real-world environment. In another example, when the given robotic cleaning device 840 reaches the threshold proximity of the location received in the message, the given robotic cleaning device 840 automatically begins capturing images from the camera and detects soiled portions of a real-world environment. The given robotic cleaning device 840 moves to each soiled portion of the real-world environment as the soiled portion is detected to clean the area.

In one example, the given robotic cleaning device 840 compares visual attributes of a soiled portion of an image captured by the on-board camera with visual features of the soiled portion 822 received in the message from the command transmission module 540. Namely, the given robotic cleaning device 840 searches for visual features that match visual features of the soiled portion 822 selected by the user using the messaging client 104 and/or automatically detected by the object recognition module 510. In response to detecting a match between visual features of the real-world environment captured by the on-board camera of the given robotic cleaning device 840 and the visual features received in the message from the command transmission module 540, the given robotic cleaning device 840 moves to and navigates to the corresponding location of the real-world environment depicted in the image captured by the on-board camera of the given robotic cleaning device 840. The given robotic cleaning device 840 then applies a cleaning process to clean the soiled portion 822.

Figure 9:
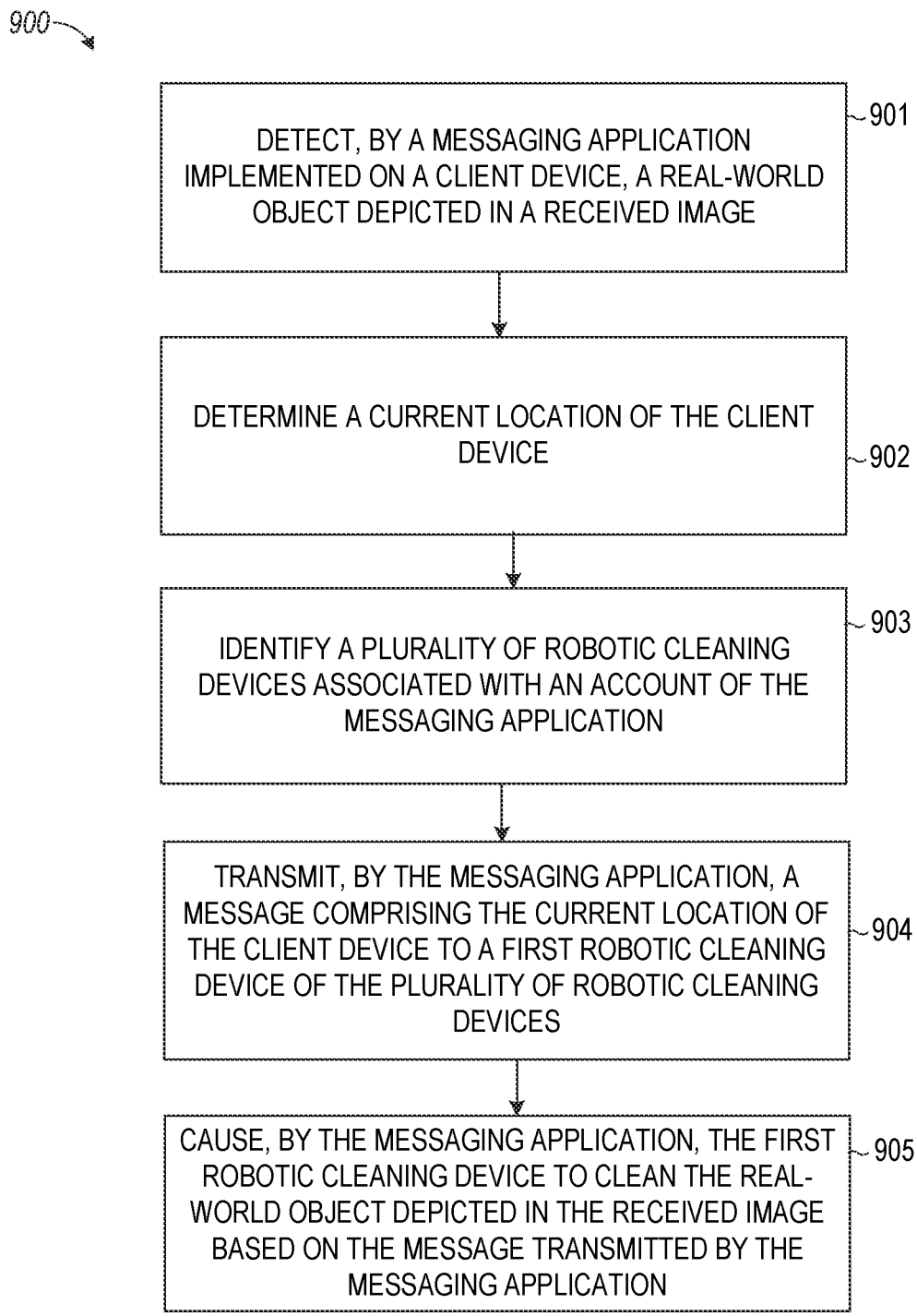
FIG. 9 is a flowchart illustrating example operations of the remote control system, in accordance with some examples.

FIG. 9 is a flowchart of a process 900 performed by the remote control system 224, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the remote control system 224 (e.g., a client device 102 or a server) detects, by a messaging application implemented on a client device, a real-world object depicted in a received image, as discussed above. For example, as shown in FIG. 7, a real-world object 710 is detected in a living room location.

At operation 902, the remote control system 224 determines a current location of the client device, as discussed above. For example, as shown in FIG. 7, the remote control system 224 determines that a current location (e.g., GPS coordinates) of the client device 102 is a living room location.

At operation 903, the remote control system 224 identifies a plurality of robotic cleaning devices associated with an account of the messaging application, as discussed above. For example, the remote control system 224 identifies a dry robotic vacuum device and a mop robotic vacuum device as corresponding to the current living room location.

At operation 904, the remote control system 224 transmits, by the messaging application, a message comprising the current location of the client device to a first robotic cleaning device of the plurality of robotic cleaning devices, as discussed above. For example, the remote control system 224 selects a dry robotic vacuum device based on an association of soiled attributes of the real-world object depicted in the image with the dry robotic vacuum device and not with the wet robotic vacuum device.

At operation 905, the remote control system 224 causes, by the messaging application, the first robotic cleaning device to clean the real-world object depicted in the received image based on the message transmitted by the messaging application, as discussed above. For example, as shown in FIG. 8, the given robotic cleaning device 840 is depicted in a camera feed of the messaging client 104 as reaching the location and cleaning the soiled portion 822 of the real-world object. This can be performed in response to the given robotic cleaning device 840 receiving the message from the command transmission module 540.

Machine Architecture

Figure 10:
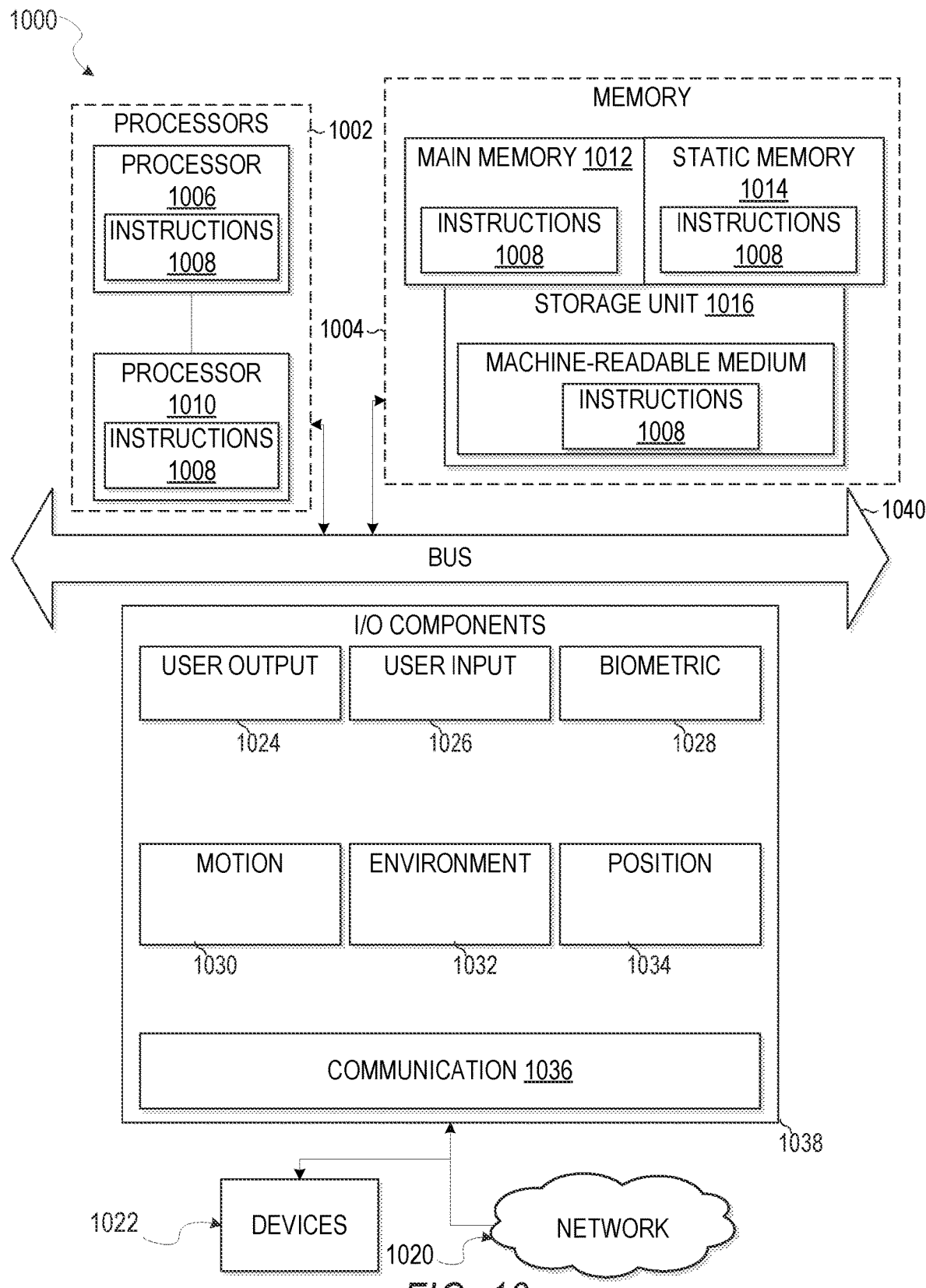
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, and rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
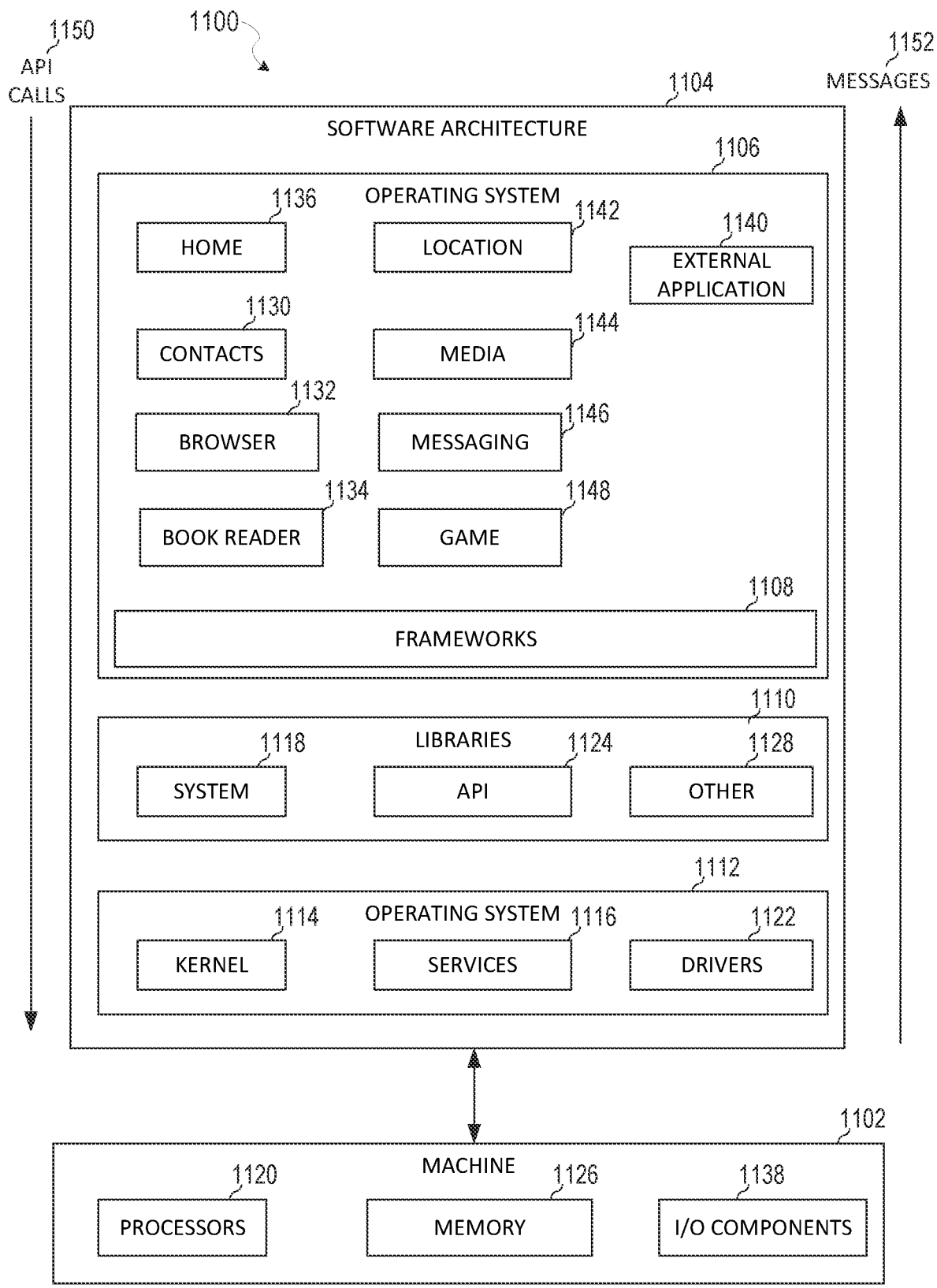
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150. The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, set-top box, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    detecting, by an application implemented on a device, a real-world object depicted in a received image;
    receiving input that specifies a type of soiled portion associated with the real-world object in response to selection of an option to specify a type of soiled portion in a notification presented on the received image;
    determining a current location of the device;
    in response to receiving the input, identifying a plurality of robotic cleaning devices associated with an account of the application;
    transmitting, by the application, a message comprising the current location of the device to a first robotic cleaning device of the plurality of robotic cleaning devices; and
    causing, by the application, the first robotic cleaning device to activate a camera of the first robotic cleaning device in response to reaching a location that is within a threshold proximity of the current location of the device and to clean the real-world object depicted in the received image using video captured by the camera.

2. The method of claim 1, further comprising:
    obtaining one or more attributes of the real-world object depicted in the image;
    identifying a soiled portion of the real-world object based on the one or more attributes; and
    selecting the first robotic cleaning device from the plurality of robotic cleaning devices based on the identified soiled portion.

3. The method of claim 2, further comprising:
    selecting the first robotic cleaning device based on the type of the soiled portion.

4. The method of claim 2, wherein the soiled portion comprises a liquid, and wherein the first robotic cleaning device comprises a wet vacuum robotic cleaning device.

5. The method of claim 2, wherein the soiled portion comprises a solid, and wherein the first robotic cleaning device comprises a dry vacuum robotic cleaning device.

6. The method of claim 2, further comprising processing the image with a trained neural network to identify the soiled portion.

7. The method of claim 1, further comprising:
    causing the first robotic cleaning device to capture a video at the current location;
    searching attributes of the video to identify the real-world object depicted in the image; and
    in response to determining that the real-world object depicted in the image matches the attributes of the video, causing the first robotic cleaning device to move to a location of the real-world object to clean the real-world object, the location corresponding to a place depicted in the video.

8. The method of claim 1, wherein the plurality of robotic cleaning devices is accessible by the device over the Internet.

9. The method of claim 1, further comprising displaying a graphical user interface comprising one or more commands for controlling the first robotic cleaning device.

10. The method of claim 1, further comprising:
    establishing a link between the application and the first robotic cleaning device over a local area network.

11. The method of claim 1, further comprising:
    generating a virtual object;
    receiving input that aligns the virtual object over the real-world object depicted in the image to identify a region of a real-world environment to clean; and
    commanding the first robotic cleaning device to clean the real-world object based on the received input.

12. The method of claim 1, further comprising:
    accessing an application programming interface (API) associated with the first robotic cleaning device;
    generating a request to clean the real-world object based on the API; and
    transmitting the request to the first robotic cleaning device.

13. The method of claim 1, further comprising:
    identifying a manufacturer server associated with the first robotic cleaning device;
    generating a request to clean the real-world object; and
    transmitting the request to the manufacturer server, wherein the first robotic cleaning device cleans the real-world object in response to the first robotic cleaning device receiving the request from the manufacturer server.

14. The method of claim 1, further comprising causing the first robotic cleaning device to search for a soiled area to clean in proximity to the real-world object depicted in the received image.

15. A system comprising:
    at least one processor of a device; and
    a memory component having instructions stored thereon that, when executed by the at least one processor, cause the at least one processor to perform operations comprising:
    detecting, by an application implemented on a device, a real-world object depicted in a received image;

receiving input that specifies a type of soiled portion associated with the real-world object in response to selection of an option to specify a type of soiled portion in a notification presented on the received image;

determining a current location of the device;

in response to receiving the input, identifying a plurality of robotic cleaning devices associated with an account of the application;

transmitting, by the application, a message comprising the current location of the device to a first robotic cleaning device of the plurality of robotic cleaning devices; and causing, by the application, the first robotic cleaning device to activate a camera of the first robotic cleaning device in response to reaching a location that is within a threshold proximity of the current location of the device and to clean the real-world object depicted in the received image using video captured by the camera.

16. The system of claim 15, the operations further comprising:

presenting, in a graphical user interface (GUI), a list of robotic cleaning devices;

receiving input that associates the first robotic cleaning device in the list of robotic cleaning devices with a first soiled portion type; and receiving additional input that associates a second robotic cleaning device in the list of robotic cleaning devices with a second soiled portion type.

17. The system of claim 15, the operations further comprising:

presenting the notification comprising a list of possible soiled portion types; and receiving input that selects one or more of the soiled portion types from the list of possible soiled portion types to identify the real-world object to clean.

18. The system of claim 17, wherein the notification is presented automatically in response to detecting a soiled portion in the received image.

19. A non-transitory computer-readable storage medium having stored thereon instructions that, when executed by at least one processor of a device, cause the at least one processor to perform operations comprising:

detecting, by an application implemented on a device, a real-world object depicted in a received image;

receiving input that specifies a type of soiled portion associated with the real-world object in response to selection of an option to specify a type of soiled portion in a notification presented on the received image;

determining a current location of the device;

in response to receiving the input, identifying a plurality of robotic cleaning devices associated with an account of the application;

transmitting, by the application, a message comprising the current location of the device to a first robotic cleaning device of the plurality of robotic cleaning devices; and causing, by the application, the first robotic cleaning device to activate a camera of the first robotic cleaning device in response to reaching a location that is within a threshold proximity of the current location of the device and to clean the real-world object depicted in the received image using video captured by the camera.

20. The non-transitory computer-readable storage medium of claim 19, the operations comprising:

presenting the notification comprising a list of possible soiled portion types; and receiving input that selects one or more of the soiled portion types from the list of possible soiled portion types to identify the real-world object to clean.

* * * * *